Patented Mar. 3, 1942

2,274,983

UNITED STATES PATENT OFFICE 2,274,983

METHOD OF TREATING PROTEIN

Russell Herman Hieronymus, Cincinnati, Ohio, assignor to The Drackett Company, Cincinnati, Ohio, a corporation of Ohio No Drawing. Application April 6, 1939,
Serial No. 266,437

2 Claims. (Cl. 260—112)

This invention relates to improved methods of treating proteinaceous material, and more particularly to the preparation of protein from vegetable sources, such as protein-containing seeds or the meal prepared from such seeds. It is an object of the invention to provide an economical and otherwise satisfactory method of preparing a protein having improved properties and characteristics.

More specifically, it is an object of the invention to provide a method of protein extraction by means of which protein especially suited for use in adhesive coatings may be obtained from a proteinaceous vegetable material, such as soy bean seed.

In the preparation of adhesive coating compositions, for example paper coatings, sizes, and glues, milk casein has been extensively used, and other binding substances such as starches and adhesive constituents of animal origin have also been employed. Milk casein, which has enjoyed the most widespread use, has a number of disadvantages, among which may be mentioned lack of uniformity of quality, fluctuation in market price from season to season, relatively slow solubility in weakly alkaline aqueous solutions, high viscosity in low water ratios, poor spreading properties, reduction in strength at moderately high humidities, low varnish and ink resistance, and objectionable odor in the final product. Vegetable proteins, and particularly soy bean protein, have been proposed heretofore for use as the essential constituent of adhesive coatings and are the preferred starting materials for the practice of the present invention. These proteins possess certain natural advantages over milk casein, such as relative stability of market price, uniformity of quality, and lack of objectionable odor. Wider use of vegetable proteins has no doubt been retarded primarily by the difficulty and expense of producing from a vegetable material a protein which, when used in more or less standardized formulae for the preparation of adhesive compositions, will impart to such compositions the required viscosity and adhesive strength. I have found, however, that it is possible materially to improve adhesive coatings of vegetable origin by proper processing of the protein, and have been able by the instant invention to prepare adhesive compositions which are in nearly every respect the equal of, or even superior to, similar compositions derived from milk casein.

The preferred method of practicing the invention, briefly stated, involves treatment of proteinaceous material with an alkaline agent to dissolve and hydrolyze the protein, and the addition to the alkaline solution, after the lapse of considerable time and preferably after the removal of undissolved matter, of a suitable oxidizing agent, the protein being ultimately precipitated from the solution. I may start with protein-containing seed, but I prefer first to pulverize the seed to form a meal, and to remove the oil therefrom, either wholly or partially, by means of solvents or the application of pressure.

The extraction of proteins with caustic alkalies is old, but in all of the known processes the final product is not entirely suitable for use in the various fields in which protein is employed, and particularly in the field of adhesives. Thus if the treatment is relatively mild, the resulting dried protein may be redissolved in weakly alkaline solutions to form a strong adhesive, but is too viscous for many purposes, and when employed as an adhesive coating will not spread properly. If the treatment is more intensive or severe, either by reason of increase in temperature, of the strength of the alkali, or of the duration of treatment, the viscosity may be improved, but the adhesive strength is impaired, and the yield of protein is usually lower.

While the effect of alkali treatment of protein is not fully known, it is believed that the alkali exerts a three-fold action on proteinaceous material. First, an alkaline solution or colloidal suspension is formed; second, the colloidal particles are swelled, the extent of swelling being greater in the case of the stronger alkalies; third, the protein is subjected to a more or less destructive hydrolysis. It is an important object of the present invention to effect swelling and partial hydrolysis of the protein and simultaneously to subject the protein to the action of the oxidizing agent, to control the reaction of hydrolysis and decomposition by proper control of time, temperature, and alkali concentration, and finally to terminate the reaction, for example by acid precipitation of the protein in any conventional manner. It is possible by this process to produce a protein which combines the desirable characteristics of high adhesive strength and low viscosity such as cannot be produced by treatment with caustic alkali alone under any conditions.

As the alkaline medium, I prefer to employ an alkali metal or an alkaline earth metal hydroxide; caustic soda is particularly effective. The preferred oxidizing agent is hydrogen peroxide, but other agents of a peroxide or per-salt nature may be used; ozone has also been employed. Examples of suitable peroxides are $Na_2O_2$, $BaO_2$, $MgO_2$, but not $MnO_2$ or $PbO_2$; examples of suitable per-salts are $NaBO_3$, $Na_2CO_4$, $K_2C_2O_6$, $Na_2C_2O_6$, perphosphates, pertitanates, pertungstates, but not persulphates, perchlorates, chlorates, nitrites, or permanganates. The compounds which are effective in imparting to the protein the desired high adhesive strength and low viscosity are those which, when added to water at or near ordinary temperature, develop a considerable amount of hydrogen peroxide in solution. The presence of hydrogen peroxide may be found by any suitable test such as decolorization of permanganate, production of yellow color with acid titanium sulphate solutions, or production of blue perchromate when treated with sulphuric acid, a soluble dichromate and ether. Ammonium compounds are generally unsuited because of the thickening effect of the ammonia, while manganese and chromium compounds are generally objectionable because of the resultant coloring of the protein. These and other ineffective or unsatisfactory oxidizing agents do not, of course, come within the scope of the present invention.

In the practice of the invention, the various conditions of the reaction such as temperature, time, concentration of agent, etc. may be varied to a considerable extent without materially affecting the characteristics of the end product, particularly if several factors are varied simultaneously. Thus it is obvious that in general a decrease in temperature may be compensated by increase of the strength of the agent employed, or increase in the duration of the reaction. However, there are certain limits within which the practice of the invention should be confined, and these limits are defined hereinafter wherever possible. The specific examples given herein are illustrative only, but will serve as a guide which will enable one skilled in the art readily to achieve the advantages of the invention and to vary the reaction conditions in such manner as to impart to the final product those characteristics which may be most desired.

One method of procedure which has been found to give excellent results, particularly in the preparation of soy bean protein for subsequent use in an adhesive composition, is as follows.

Example I

Soy bean meal in the form of ground flake is used as the starting material, the oil having been largely expressed or extracted by solvents and the solvent removed. One hundred pounds of the meal is introduced in 800 pounds of water at a temperature of 46°–48° C. and mixed until completely wetted out. Ten pounds of caustic soda in fifty pounds of water at 46°–48° C. is then added with thorough mixing for about fifteen minutes; during this period the temperature may be permitted to decline to 42°–43° C. The undissolved matter is then separated as rapidly as possible, and the residue washed once with 350 pounds of water at 45° C. The wash water may be returned to the solution or used in the initial step of a subsequent extraction. The operations thus far outlined should be completed within about 80 minutes from the time of starting; the temperature should preferably be between 38°–40° C. One pound of 30% hydrogen peroxide, with or without dilution by cold water, is now added rapidly with stirring. If necessary, the solution is then filtered or clarified by a centrifuge. At the end of 120 minutes from the time of starting, the temperature having declined to about 30° C., the protein is precipitated with about 130 pounds of 10% sulphuric acid in any one of various known ways, such as rapid addition with stirring and adjustment of the final acidity to a pH value of about 4.5. The precipitated protein is washed by decantation or otherwise, water is removed, so far as possible, by filtering or centrifuging, and the resulting cake is shredded or granulated and rapidly dried at a moderate temperature, not over 90° C. and preferably less.

The temperatures may be varied within and beyond the foregoing specified ranges, and are somewhat elastic. In general, however, the temperature should be so controlled that an average or mean temperature for the entire period preceding precipitation of the protein shall be 36°–38° C., this being computed by averaging the temperature taken at short, equal intervals of time of about two minutes.

Various details of the foregoing procedure may be modified to some extent, but ordinarily any modification of one factor requires a change in another factor to offset the effect thereof. For example, the amount of caustic soda may be varied from about seven pounds to about twelve pounds, the average amount being roughly about 10% by weight of the meal. If less than ten pounds of caustic soda is used, either the mean temperature must be raised (although no temperature should be above about 55° C.), or the total time of treatment should be increased. The concentration of alkali can be lowered by the addition of water if the time or the temperature is suitably increased, but should ordinarily be less than 4% and greater than 1%. It is thus exceedingly difficult to define the limiting values within the range of which satisfactory results may be achieved, but it is obvious that the advantages of the invention may be realized provided the alkali treatment is carried out, on the whole, with a degree of severity comparable to that established in the foregoing detailed procedure. It will nevertheless be obvious to one skilled in the art that, in general, minimum amounts of alkali and of water, and fairly high temperatures will be preferred in order to save time and the expense of material and equipment.

The amount of hydrogen peroxide can be reduced very slightly under some conditions, or it can be greatly increased. Increased amounts of the oxidizing agent are of no value in reducing glue viscosity (except to compensate for possible loss of effective oxygen by decomposition), and result merely in a product of somewhat lighter color. In the event some other oxidizing agent is employed, the amount which will give an effect comparable to that obtained by hydrogen peroxide may be measured roughly by the relative available active oxygen content.

It will also be appreciated that the nature of the oxidizing agent employed may effect the amount of the alkaline agent required. Thus when sodium perborate or sodium peroxide is used as the oxidizing agent, the total amount of more or less free caustic alkali is increased. Hence either a less amount of alkaline agent may be used at the start, or the time or temperature of the whole reaction may be reduced.

Satisfactory results have been attained, by suitable adjustment of operating conditions, when the whole reaction has required as little time as sixty minutes or has been continued for a period of several hours. The oxidizing agent can be introduced at any time during the reaction, but is preferably added after the alkali has formed a colloidal suspension of the protein and has effected some swelling and partial hydrolysis of the colloidal particles, since the oxidizing agent apparently reacts in the desired manner only with the partially hydrolyzed protein. It is generally preferable to introduce the oxidizing agent at least fifteen minutes before the reaction is terminated by precipitation of the protein, although reasonably good results have been secured by treatment with the oxidizing agent for periods as small as five minutes.

A second example, illustrative of some of the permissible variations, is as follows:

*Example II*

One hundred pounds of meal (preferably prepared as hereinbefore indicated) is treated with 1600 pounds of water at a temperature of 43°–44° C. and mixed until completely wetted out. Seven pounds of caustic soda in 35 pounds of water is added and well mixed for fifteen to thirty minutes. The undissolved matter is separated as rapidly as possible and within one and one-half hours of starting. The temperature can be allowed to decline during this period to about 38° C. Then 0.7 pound of sodium peroxide is added to the liquor with stirring. When three and one-half hours have elapsed, measured from the addition of caustic soda, the protein is precipitated, washed, and otherwise treated as before.

It will be understood that variations in the protein constituents of the seeds, such as result from variation in the degree of maturity, growth under different conditions, or modification by varying temperatures during oil and solvent removal, often require minor modifications of temperature or duration of the reaction, or the amount of caustic alkali employed.

Various seeds other than soy bean which contain vegetable protein, such as cottonseed, peanut, etc., can be defatted and treated in a similar manner, such suitable modification being adopted as may become necessary owing to the nature and extent of the known protein constituents of such seeds.

The particular method employed to terminate the reaction and precipitate the protein is not important, provided precautions are taken to prevent undesired reactions. While the solution is preferably acidified by any of the acid substances commonly employed for this purpose, precipitation may be effected by other well-known precipitating agents and methods.

If precipitation is effected by the addition of an acidifying medium, it is important to effect the necessary reduction of the pH value of the alkaline solution almost instantaneously in order to prevent acid reaction with the protein and consequent reduction of the adhesive strength. The best method of accomplishing this rapid change is by continuous precipitation of the protein at the desired pH value, although rapid agitation and quick addition of acid is almost as effective.

The protein which is prepared in accordance with the present invention, after being dried for convenience in handling, may thereafter be dissolved readily in mild alkaline solutions. The present method also imparts to soy bean protein an adhesive strength which is greater than that of milk casein.

The improvement in the characteristics of the protein effected by the present invention, and particularly in the properties of adhesive strength and viscosity which are important in the preparation of adhesive coatings and the like, may be readily demonstrated. Thus when soy bean protein is used as an adhesive together with kaolin in the preparation of a paper coating, it is common first to dissolve the protein in an alkaline solution, such as one containing caustic soda, soda ash, borax, or the like, following which it is added to a previously made mixture of kaolin and water, the whole being mixed to a smooth consistency. It is ordinarily desirable to use as little water as possible so that a sufficiently heavy coating may be applied without causing application or brush-out difficulties, and in order that the amount of water which must be evaporated in drying the paper may be reduced to a minimum. In a suitable laboratory test, 14 grams of protein are dissolved in 70.3 cc. of water containing 1.67 grams of soda ash, with the aid of heat and stirring. This solution is added to a mixture of 100 grams of English china clay and 100 cc. of water, and the whole thoroughly mixed and stirred. The mixture can then be applied to a paper, for example by a commercial brush-coating machine, and the coated paper can be tested in any conventional way, for example by the use of standard paper testing waxes, which may be purchased on the open market. Thus the waxes are softened in a flame, placed upon the coated paper, cooled, and then pulled off sharply. Each wax bears a number, and the strength of the coating is designated by the lowest numbered wax which removes the coating.

It is found that when a soy bean protein has been prepared in accordance with this invention, it can be used in a coating preparation such as that just described, and the coating mixture thus obtained will be of suitable concentration and viscosity. When applied to paper and tested with standard waxes, the strength is found to be indicated by No. 7 wax. If only 12 grams of soy bean protein are employed in the mixture, the foregoing test indicates a value of only No. 6 wax.

In now the protein extraction conditions herein described be adhered to in all respects except that no oxidizing agent is added, a protein will be obtained which is very similar in appearance to the product of the instant method. However, when such a protein is made into a coating mixture, as described hereinbefore, either an insoluble gel is formed, or it is found necessary to add from 30–100 cc. more water to reduce the viscosity to a value suitable for machine operation. As already indicated, the added water requires the evaporation of more water per pound of coating, or, for a relatively heavy coating, renders impossible the application of sufficient mixture to give the desired dry coating weight. If this difficulty is avoided by increasing the severity of the extraction conditions, for example by the use of a greater quantity of alkali, less water, higher temperature, or longer duration of the reaction, the strength of the coating prepared from the protein is adversely affected, and when tested with standard waxes, the value is not No. 7 wax, but No. 6 or even as low as No. 5 wax. Furthermore, when more severe conditons are employed to reduce the viscosity, the yield of protein is materially lowered as hereinbefore pointed out.

It is thus apparent that when hydrogen peroxide is added to the alkali medium under the conditions hereinbefore set forth, the properties of the extracted protein are materially improved, and particularly the property of imparting to adhesive coatings the highly desirable characteristics of low viscosity and high adhesive strength without adverse effect on other desirable characteristics, and that a protein having these desirable properties cannot be obtained by more modification of the conditions of simple alkaline extraction.

Having thus described the invention, what is claimed as new and desired to be secured by Letters Patent is:

1. A method of extracting protein from oleaginous vegetable material, which comprises the steps of subjecting the material for a period of from about one-half to several hours to the action of caustic soda in amount not less than about 7% by weight of the weight of the material, controlling the alkaline concentration, temperature and duration of reaction within the aforementioned limits so as to form a colloidal suspension and to swell and partially hydrolyze the colloidal particles, adding hydrogen peroxide to the alkaline solution continuing the reaction for not less than about 15 minutes and for a period sufficiently long to alter the protein in such manner that the viscosity imparted thereby to a mild alkaline adhesive dispersion is materially reduced, and thereafter precipitating the protein.

2. A method of preparing soy bean protein to improve the same for use in adhesive coatings, which comprises the steps of subjecting soy bean meal for a period of form about one-half to several hours to the action of caustic soda in amount not less than about 7% by weight of the weight of the meal, controlling the alkaline concentration, temperature and duration of reaction within the aforementioned limits so as to form a colloidal suspension and to swell and partially hydrolyze the colloidal particles, adding hydrogen peroxide to the alkaline solution continuing the reaction for a period not less than about 15 minutes and sufficiently long to alter the protein in such manner that the viscosity imparted thereby to a mild alkaline adhesive dispersion is materially reduced, and thereafter precipitating the protein.

RUSSELL HERMAN HIERONYMUS.